United States Patent
Suzuki

(10) Patent No.: US 7,911,888 B2
(45) Date of Patent: Mar. 22, 2011

(54) ACTUATOR FOR PICKUP, PICKUP DEVICE, RECORDING MEDIUM DRIVE DEVICE, AND METHOD OF MANUFACTURING ACTUATOR FOR PICKUP

(75) Inventor: Jun Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 903 days.

(21) Appl. No.: 10/594,948

(22) PCT Filed: Mar. 30, 2005

(86) PCT No.: PCT/JP2005/006153
§ 371 (c)(1),
(2), (4) Date: Jul. 30, 2007

(87) PCT Pub. No.: WO2005/096287
PCT Pub. Date: Oct. 13, 2005

(65) Prior Publication Data
US 2008/0037384 A1 Feb. 14, 2008

(30) Foreign Application Priority Data

Mar. 30, 2004 (JP) ................................. 2004-099314
Mar. 30, 2004 (JP) ................................. 2004-099392

(51) Int. Cl.
*G11B 7/00* (2006.01)
(52) U.S. Cl. .................... 369/44.15; 369/44.11; 720/682
(58) Field of Classification Search ................ 369/44.15
See application file for complete search history.

(56) References Cited

U.S. PATENT DOCUMENTS 6,775,207 B2 * 8/2004 Takeshita et al. .......... 369/44.15
2004/0070850 A1 * 4/2004 Kim et al. ..................... 359/811

FOREIGN PATENT DOCUMENTS

| JP | 2-121126 | 5/1990 |
| JP | 2-289927 | 11/1990 |
| JP | 3-2426 | 11/1991 |
| JP | 6-349091 | 12/1994 |
| JP | 7-50023 | 2/1995 |
| JP | 8-273179 | 10/1996 |
| JP | 9-259453 | 10/1997 |
| JP | 2000-242942 | 9/2000 |
| JP | 2001-93177 | 4/2001 |
| JP | 2001-229555 | 8/2001 |
| JP | 2001-344784 | 12/2001 |
| JP | 2003-346366 | 12/2003 |
| JP | 2004-47060 | 2/2004 |

* cited by examiner

*Primary Examiner* — Jorge L Ortiz Criado
(74) *Attorney, Agent, or Firm* — Kratz, Quintos & Hanson, LLP

(57) ABSTRACT

Provided is an actuator for a pickup, in which end parts of a plurality of suspensions (550A to 550F) of five or more are positioned on a virtual circle (X) formed on a plane by being projected onto the plane including both a focusing direction and a tracking direction. A rolling center (O) defined as a center of the virtual circle (X) is made to coincide with all three, two, or one of a center (Os) of the gravity of a lens holder (600), a center (Os) of the drive force of the lens holder (600), and a center (Os) of the translational force of the suspensions (550A to 550F). Since the rolling center (O) coincides with all three, two, or one of those centers (Os), a rotational moment is not generated on the lens holder (600) and, therefore, generation of unnecessary resonance can be prevented.

10 Claims, 10 Drawing Sheets

ACTUATOR FOR PICKUP, PICKUP DEVICE, RECORDING MEDIUM DRIVE DEVICE, AND METHOD OF MANUFACTURING ACTUATOR FOR PICKUP

TECHNICAL FIELD

The present invention relates to an actuator for a pickup, a pickup device, a recording medium drive device, and a method of producing the actuator for the pickup.

BACKGROUND ART

Conventionally, an actuator for a pickup has been employed as a mechanism for recording data onto an optical recording medium and/or playing back the content thereof. Such the actuator for a pickup may have various types of constructions. In recent years, among various types of actuators for pickups, studies have been conducted on those capable of recording data onto an optical recording medium and/or playing back the content thereof at a higher-x speed.

For example, such the actuator for a pickup is equipped with a lens holder for supporting an objective lens, a magnet, and the like, a plurality of drive coils for driving the lens holder, a base, and four linear elastic members each connected at both ends thereof between the lens holder and the base. The lens holder is so supported as to be able to rock in a focusing direction and a tracking direction (e.g., Patent Document 1). This actuator for a pickup has been drawing attention especially for its advantages in weight saving and enhancement of bandwidth.

The aforementioned actuator for a pickup may have six or more linear elastic members (Patent Document 2).

In the actuator for a pickup constructed as described above, the four or six linear elastic members are designed such that the line segments linking their ends with each other constitute an oblong on a plane (i.e., a plane stretching perpendicularly to a longitudinal direction of the linear elastic members) including both a focusing direction and a tracking direction.

The lens holder rolls with respect to the base around a rotating center, namely, a center of a virtual circle circumscribed by those ends.

A center of the oblong substantially coincides with a center of mass of the lens holder and a drive center of the lens holder. In addition, the drive center of the lens holder coincides with a center of translational forces of the plurality of the linear elastic members.

[Patent Document 1]: JP 2001-229555 A (FIGS. 15 and 16)
[Patent Document 2]: JP 08-273179 A (paragraph [0031])

DISCLOSURE OF THE INVENTION

Problems to be Solved by the Invention

In the actuator for a pickup constructed as described above, spring forces (elastic forces) of the linear elastic members may be different from one another, so the center of translational forces of the linear elastic members deviates from the center of the oblong.

Those skilled in the art usually adopt such a design that the center of gravity of mass and the center of a driving force coincide with the center of the oblong.

With such the design, the center of gravity of the mass and the center of the driving force do not coincide with a rolling center. Thus, an unwanted rotational moment is applied to the lens holder and unwanted resonance occurs. Also, a rolling frequency increases when the lens holder rolls, which causes deterioration in damping characteristics. This deterioration in damping characteristics leads to continuation of oscillations.

Further, in the conventional art, a high mounting accuracy is required in a production process, in addition to the foregoing problem. Also, deformation occurs due to changes in temperature resulting from a difference in coefficient of linear expansion between a material of the linear elastic members (metal) and a material of the base and the lens holder (synthetic resin).

It is an object of the present invention to provide an actuator for a pickup which makes it possible to suppress a rise in rolling frequency and to prevent deterioration in damping characteristics even when a movable portion causes rolling with respect to a fixed portion, a pickup device, a recording medium drive device, and a method of producing an actuator for a pickup.

Means for Solving the Problems

The present invention provides an actuator for a pickup which includes: a fixed portion; a movable portion designed to be movable in each of a focusing direction extending along an optical axis of an objective lens and in a tracking direction substantially perpendicular to the focusing direction, due to a driving force transmitted from a drive portion, for holding the objective lens; and a plurality of linear elastic members of five or more each having ends connected to the movable portion and the fixed portion, respectively. The plurality of the linear elastic members is equal to one another in length dimension between the fixed portion and the movable portion. The ends of the plurality of the linear elastic members are located on a virtual circle formed on a plane by being projected onto a plane including both the focusing direction and the tracking direction. The virtual circle has a center defined as a rolling center with which a center of translational forces of the linear elastic members coincides. At least one of a center of gravity of the movable portion and a center of a driving force of the movable portion coincides with the rolling center.

The present invention also provides an actuator for a pickup which includes: a fixed portion; a movable portion designed to be movable in each of a focusing direction extending along an optical axis of an objective lens and a tracking direction substantially perpendicular to the focusing direction, due to a driving force transmitted from a drive portion, for holding the objective lens; and a plurality of linear elastic members of five or more each having ends connected to the movable portion and the fixed portion, respectively. The plurality of the linear elastic members is equal to one another in length dimension between the fixed portion and the movable portion. The ends of the plurality of the linear elastic members are located on a virtual circle formed on a plane by being projected onto a plane including both the focusing direction and the tracking direction. The virtual circle has a center defined as a rolling center, which coincides with a center of translational forces of the linear elastic members, a center of gravity of the movable portion, and a center of a driving force of the movable portion.

The present invention also provides an actuator for a pickup which includes: a fixed portion; a movable portion designed to be movable in each of a focusing direction extending along an optical axis of an objective lens and in a tracking direction substantially perpendicular to the focusing direction, due to a driving force transmitted from a drive portion, for holding the objective lens; and four linear elastic members each having ends connected to the movable portion and the fixed portion, respectively. The ends of the four linear elastic members are located on a virtual circle formed on a plane by being projected onto a plane including both the focusing direction and the tracking direction; the ends are linked with each other by line segments constituting substantially a trapezoidal shape. The virtual circle has a center defined as a rolling center, which coincides with at least one of a center of gravity of the movable portion, a center of a driving force of the movable portion, and a center of translational forces of the linear elastic members.

The present invention provides a pickup device which includes: the actuator for a pickup described above; and an actuator drive portion for driving the actuator for a pickup.

The present invention provides a recording medium drive device which includes the pickup device described above.

The present invention provides a method of producing an actuator for a pickup including: a fixed portion; a movable portion designed to be movable in each of a focusing direction extending along an optical axis of an objective lens and in a tracking direction substantially perpendicular to the focusing direction, to hold the objective lens; and a plurality of linear elastic members of five or more each having ends connected to the movable portion and the fixed portion, respectively. The method includes: equalizing the plurality of the linear elastic members to one another in length dimension between the fixed portion and the movable portion; locating the ends of the plurality of the linear elastic members on a virtual circle formed on a plane by being projected onto a plane including both the focusing direction and the tracking direction, respectively; making a center of translational forces of the linear elastic members coincide with a center of the virtual circle which is defined as a rolling center; and making at least one of a center of gravity of the movable portion and a center of a driving force of the movable portion coincide with the rolling center.

The present invention also provides a method of producing an actuator for a pickup including: a fixed portion; a movable portion designed to be movable in each of a focusing direction extending along an optical axis of an objective lens and in a tracking direction substantially perpendicular to the focusing direction, to hold the objective lens; and four linear elastic members each having ends connected to the movable portion and the fixed portion, respectively. The method includes: locating the ends of the four linear elastic members on a virtual circle formed on a plane by being projected onto a plane including both the focusing direction and the tracking direction; ensuring that line segments linking the ends with each other assume substantially a trapezoidal shape; and making at least one of a center of gravity of the movable portion, a center of a driving force of the movable portion, and a center of translational forces of the linear elastic members coincide with a center of the virtual circle defined as a rolling center.

EXPLANATION OF CODES

1: pickup device
340A, 340B: magnets
400: actuator for pickup
500: suspension base (fixed portion)
550A-550F: suspension (linear elastic member)
600: lens holder (movable portion)
610A, 610B: coil substrates
X: virtual circle
O: rolling center
Os: center of translational forces

BEST MODE FOR CARRYING OUT THE INVENTION

First Embodiment

A first embodiment of the present invention will be described hereinafter with reference to the drawings.

[Construction of Pickup Device]

Figure 1:
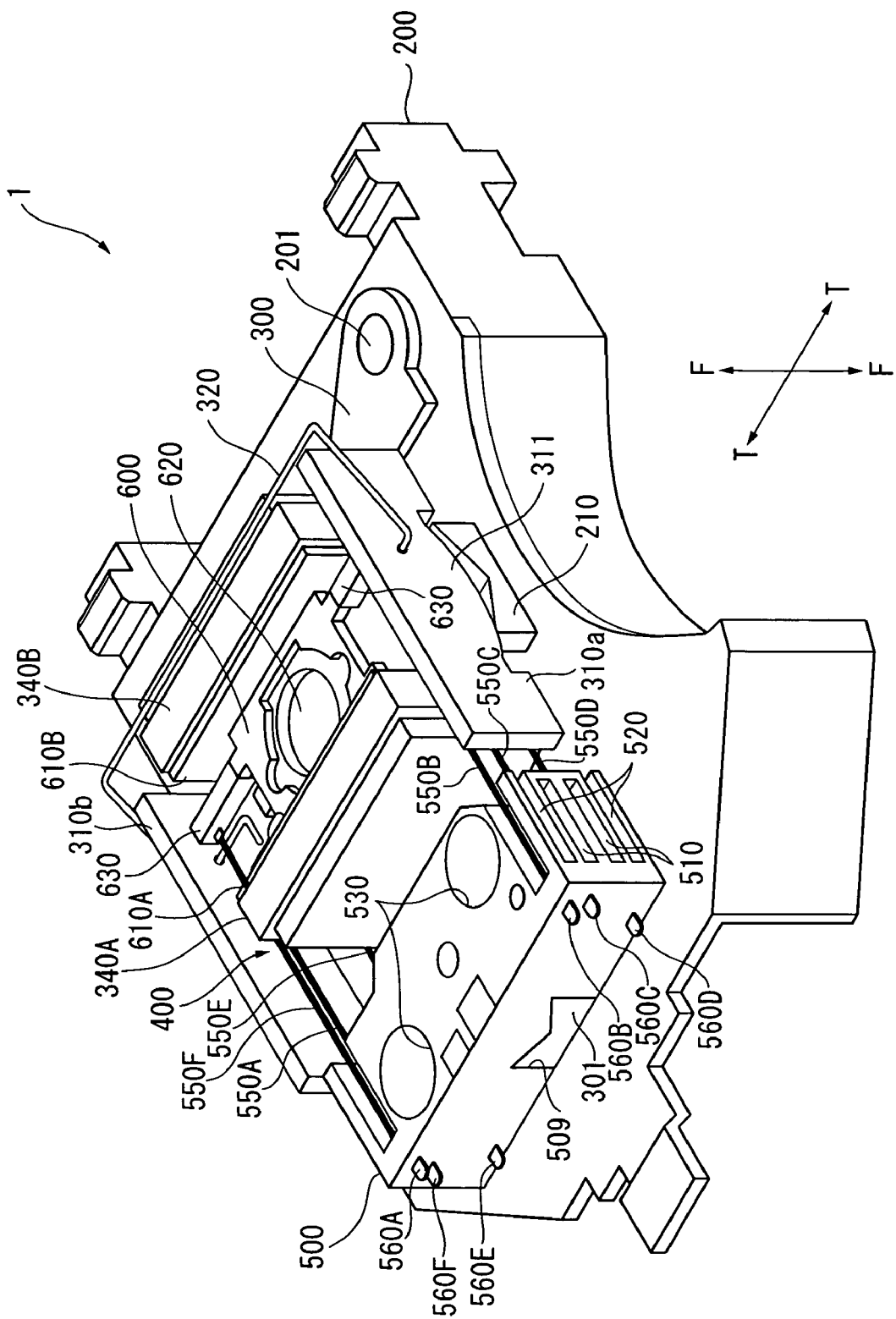
FIG. 1 is a perspective view showing an entire pickup device according to a first embodiment of the present invention.
Figure 2:
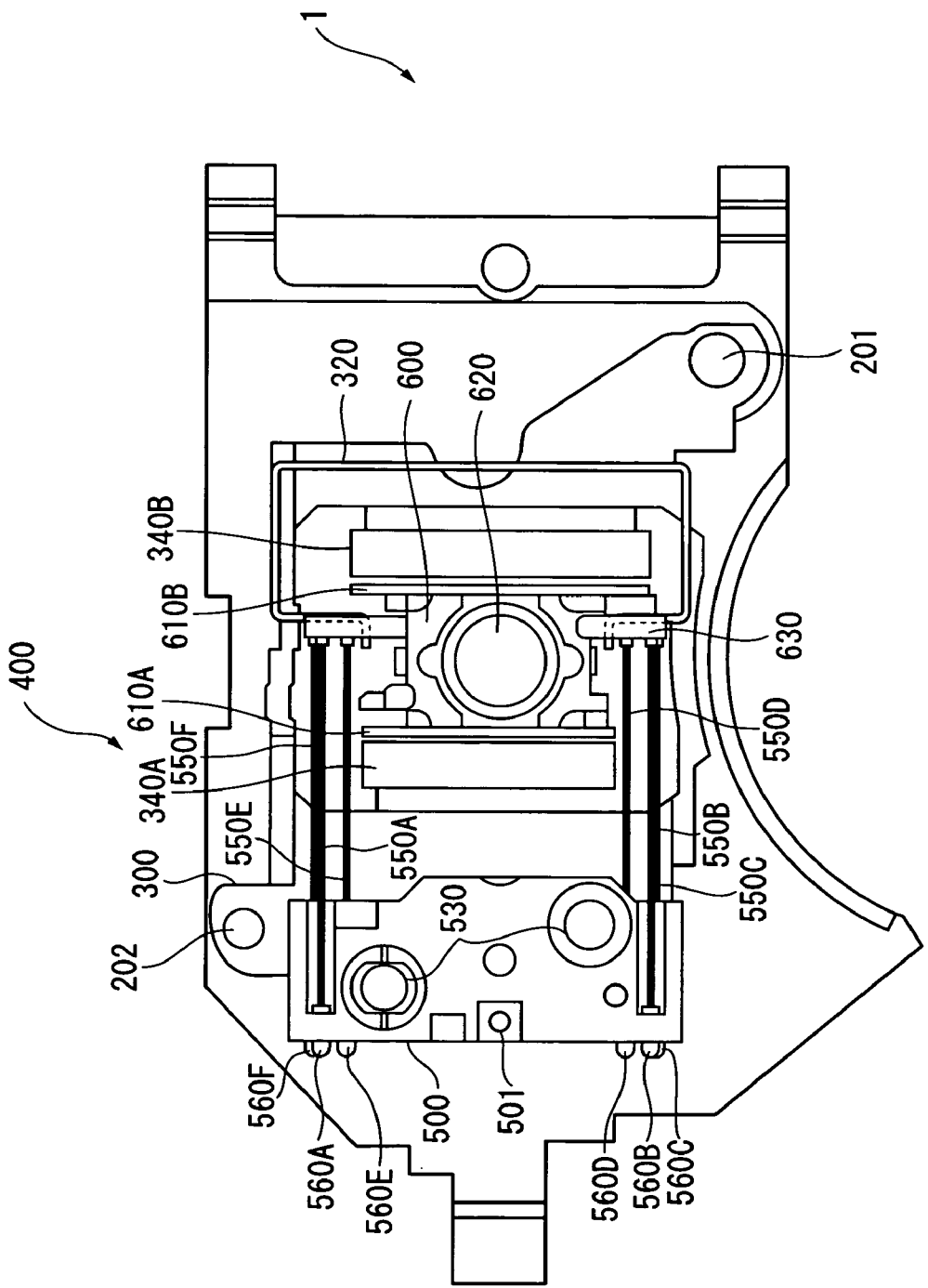
FIG. 2 is a plan view showing the entire pickup device according to the first embodiment of the present invention.

In FIGS. 1 and 2, a pickup device 1 is a device for recording data onto an optical disc as an optical recording medium such as a CD, a DVD, or a blue ray, and/or playing back content thereof. Accordingly, the pickup device 1 is incorporated into, for example, a drive device for recording data onto those optical recording media and/or playing back the content thereof.

This pickup device 1 is equipped with a pickup body 200, an actuator base 300 fixed to the pickup body 200, and an actuator 400 for a pickup fixed to the actuator base 300.

The actuator 400 for a pickup is equipped with a suspension base 500 as a fixed portion, a lens holder 600 as a movable portion, and six suspensions 550A to 550F as linear elastic members for connecting the suspension base 500 and the lens holder 600 to each other.

The actuator base 300 is equipped with erected portions 310a and 310b extending in parallel to each other. Projections 311 protruding toward the pickup body 200 side are formed on the erected portions 310a and 310b, respectively.

The actuator base 300 is positioned by engaging the projections 311 with an M-shaped holding portion 210 formed on the pickup body 200. The actuator base 300 is inserted at one end thereof in a spring-loaded strut 201 fixed to the pickup body 200, and fixed at the other end by means of a fixing screw 202.

The actuator 400 for a pickup is positioned between the erected portions 310a and 310b by engaging a V-shaped groove 509 formed in the suspension base 500 with an M-shaped protruding plate 301 formed on the actuator base 300. The actuator 400 for a pickup is fixed to the actuator base 300 by fastening the suspension base 500 to the actuator base 300 by means of screws.

The erected portions 310a and 310b are provided with a stopper member 320. The stopper member 320 is a linear member that is bent generally into a squared U shape as a whole. Tips of the stopper member 320 are provided with restricting portions (not shown) protruding inwardly of the erected portions 310a and 310b, namely, toward the lens holder 600 side. The stopper member 320 is mounted by inserting the restricting portions into insertion holes (not shown) provided in the erected portions 310a and 310b. The stopper member 320 serves to limit strokes (i.e., movable range) of the lens holder 600 in a focusing direction F and a tracking direction T. Thus, when a focus servo or a tracking servo malfunctions, the lens holder 600 itself, a member mounted on the lens holder 600 and the like are prevented from being damaged through a movement of the lens holder 600 leading to a collision thereof with the pickup body 200 or other members.

A laser beam source (not shown) is mounted at an end of the actuator base 300. Laser beams emitted from the laser beam source pass through an optical path constituted by an optical system disposed within the actuator base 300, and then reach a region below an objective lens 620 to be described later. A raising mirror (not shown) is disposed below the objective lens 620. The laser beams are deflected upward by the raising mirror and pass through the objective lens 620 upward from below. An optical disc (not shown) is disposed above the objective lens 620. The objective lens 620 converges the laser beams onto an information recording face of the optical disc.

The suspensions 550A to 550F connect the suspension base 500 to the lens holder 600. For the suspensions 550A to 550F, it is preferable to use a material which is so strong that is resistant to a large bending stress as a spring material and which exhibits excellent fatigue properties for repeated operations, for example, beryllium copper. Instead of using beryllium copper, however, as an alternative material, it is also appropriate to use other materials exhibiting high strength and excellent fatigue properties, such as a phosphor-bronze alloy.

Tips of the suspensions 550A to 550F are provided with flat plate portions 560A to 560F, which are inserted in the suspension base 500 and the lens holder 600.

The suspension base 500 is formed through insert molding, namely, by installing the flat plate portions 560A to 560F at the tips of the suspensions 550A to 550F in a mold and injecting a synthetic resin.

Concave suspension insertion portions 520 are formed at four corners of the suspension base 500, respectively. The suspensions 550A to 550F are inserted into the suspension insertion portions 520, respectively, and the flat plate portions 560A to 560F provided at the tips of the suspensions 550A to 550F, respectively, are so mounted as to extend through from a face opposed to the suspension insertion portions to a rear face side.

A V-shaped groove 509 is formed on a rear face of the suspension base 500. The V-shaped groove 509 is engaged with the M-shaped protruding plate 301 formed on the actuator base 300, thereby positioning the suspension base 500 on the actuator base 300.

Two mounting holes 530 are so provided as to extend through from an upper face of the suspension base 500 to a lower face thereof. The actuator 400 for a pickup is fixed to the actuator base 300 by inserting spring-loaded screws (not shown) and fixing screws (not shown) into the mounting holes 530, respectively.

The lens holder 600 is connected to the suspension base 500 in a rockable manner by means of the six suspensions 550A to 550F. The lens holder 600 is a generally rectangular member with a hollow structure which has been molded with a synthetic resin. The lens holder 600 is formed simultaneously with the suspension base 500 through insert molding, namely, by installing the flat plate portions 560 of the suspensions 550A to 550F in the mold and injecting a synthetic resin. A pair of support arms 630 is respectively provided at opposite ends of the lens holder 600 in the tracking direction T. The suspensions 550A to 550F are fixed at ends thereof to the corresponding support arms 630.

Coil substrates 610A and 610B are respectively mounted on opposite lateral faces of the lens holder 600, and the objective lens 620 is mounted at substantially a center of an upper face of the lens holder 600.

Magnets 340A and 340B are so fixed to the actuator base 300 as to be opposed to the pair of the coil substrates 610A and 610B, respectively, mounted on the lens holder 600. The coil substrates 610A and 610B and the magnets 340A and 340B constitute the actuator drive portion according to the first embodiment.

The pair of the magnets 340A and 340B is fixed at opposing positions, and a magnetic field is formed in a space between the magnets 340A and 340B according to magnetization patterns of the respective magnets 340A and 340B.

The lens holder 600 having the coil substrates 610A and 610B mounted to the lateral faces thereof is disposed within the magnetic field formed by the pair of magnets 340A and 340B. Thus, when a driving current having a frequency within a predetermined servo bandwidth (e.g., 0 to 5 KHz) is caused to flow through a focusing coil and a tracking coil, which are respectively formed on the coil substrates 610A and 610B, the lens holder 600 moves together with the objective lens 620 in the focusing direction F and the tracking direction T due to a force generated by currents within the coils and the magnetic field.

[Mounting Structure of Suspensions]

Figure 3A:
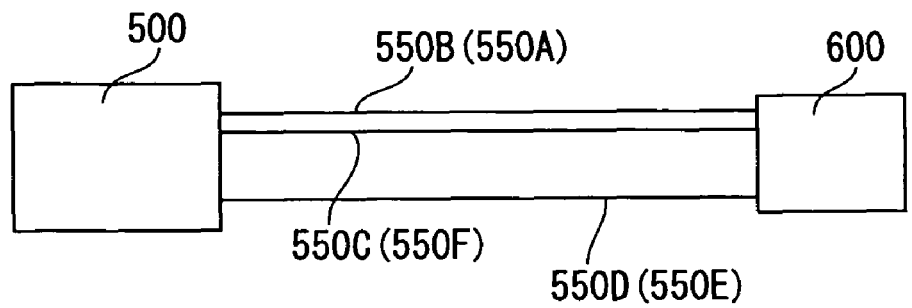
FIG. 3A is a schematic diagram showing a mounting structure of suspensions according to the first embodiment of the present invention as viewed from a tracking direction.
Figure 3B:
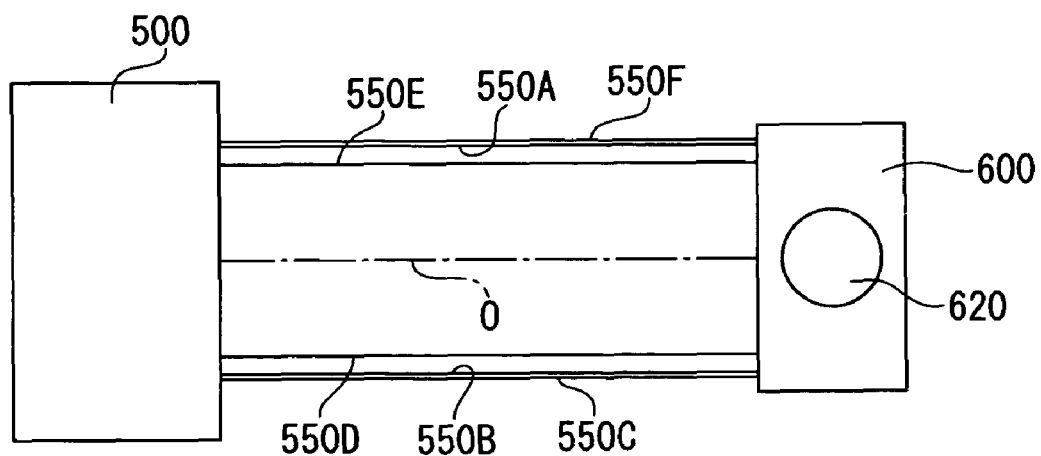
FIG. 3B is a schematic diagram showing the mounting structure of the suspensions according to the first embodiment of the present invention as viewed from a focusing direction.
Figure 4:
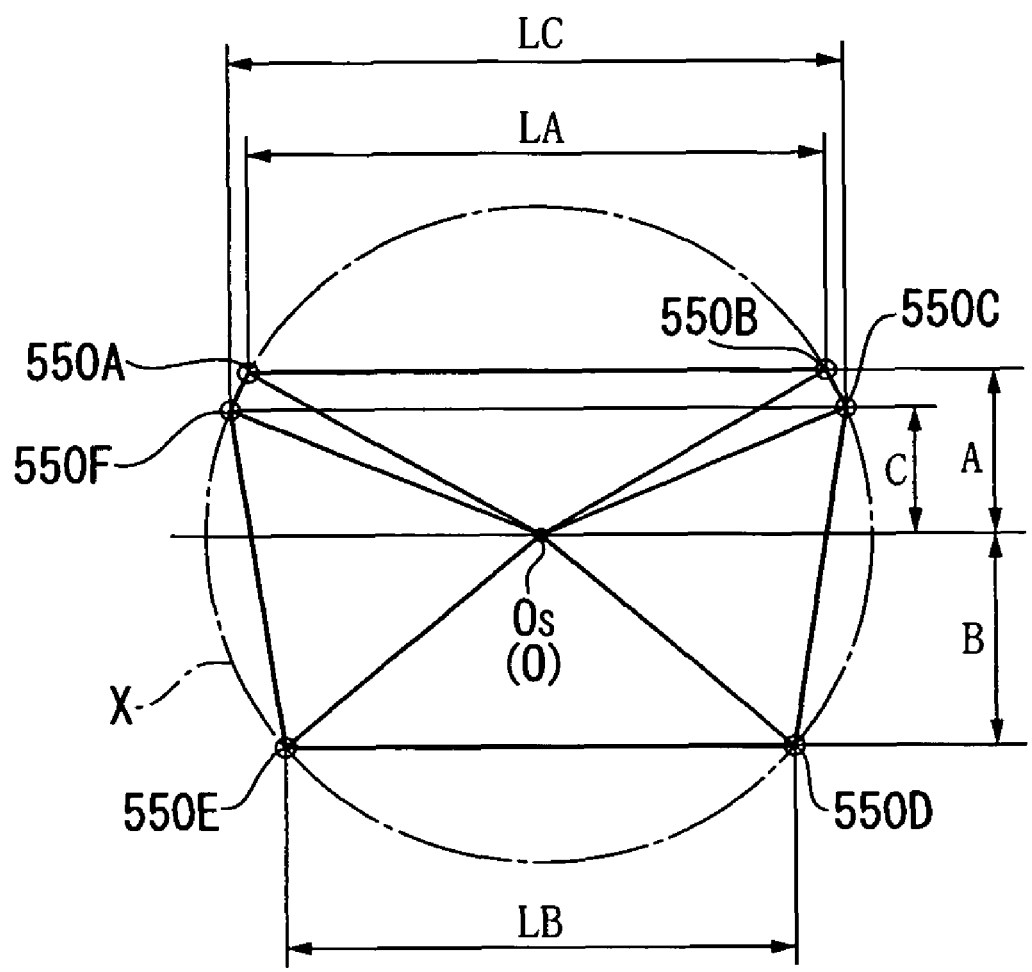
FIG. 4 is a schematic diagram showing the mounting structure of the suspensions according to the first embodiment of the present invention as viewed in a direction from a lens holder to a suspension base.

FIGS. 3A, 3B, and 4 each schematically show a mounting structure of the suspensions 550A to 550F.

In FIGS. 3A and 3B, the six suspensions 550A to 550F are disposed in parallel to one another.

In FIG. 4, the ends (connection portions) of the six suspensions 550A to 550F on the suspension base 500 side and the lens holder 600 side are located on a virtual circle X, which is formed on a plane by being projected onto a plane including both the focusing direction and the tracking direction. A center O of the virtual circle X is defined as a rolling center O of the lens holder 600. The plane on which the virtual circle X is formed in parallel to a plane stretching perpendicularly to a longitudinal direction of the six suspensions 550A to 550F.

The rolling center O ensures that the suspensions 550A to 550F rotate without causing any strain in an axial direction thereof, when a rotational force is applied to the lens holder 600 on the plane stretching perpendicularly to the longitudinal direction of the suspensions 550A to 550F.

Line segments linking the ends of the adjacent ones of the suspensions 550A to 550F with each other, respectively, constitute a hexagon that is laterally symmetrical with respect to the rolling center O.

The line segment linking the ends of the suspension 550A and the suspension 550B with each other extends in parallel to the tracking direction and has a length dimension LA. A line segment drawn onto this line segment from the rolling center has a length dimension A.

The line segment linking the ends of the suspension 550D and the suspension 550E with each other extends in parallel to the tracking direction and has a length dimension LB. A line segment drawn onto this line segment from the rolling center has a length dimension B.

The line segment linking the ends of the suspension 550F and the suspension 550C with each other extends in parallel to the tracking direction and has a length dimension LC. A line segment drawn onto this line segment from the rolling center has a length dimension C.

It should be noted that the suspensions 550A to 550C and 550F are disposed on a recording medium side (i.e., in an upper region in FIG. 4) with respect to the rolling center O, and that the suspensions 550D and 550E are disposed on the opposite side of the recording medium (i.e., in a lower region in FIG. 4) with respect to the rolling center O. There are also established the following relationships of LC>LA>LB and B>A>C.

The following arrangement is adopted to set a center Os of translational forces of the suspensions 550A to 550F. The center Os of translational forces of the suspensions 550A to 550F is a point where spring forces do not cause balanced rotation when the lens holder 600 is translated.

Given that KA represents a modulus of elasticity (spring rigidity) of the suspensions 550A and 550B, which are adjacent to each other in the tracking direction, that KB represents a modulus of elasticity (spring rigidity) of the suspensions 550D and 550E, and that KC represents a modulus of elasticity (spring rigidity) of the suspensions 550F and 550C, the balance of moment is expressed as $KC \times C + KA \times A = KB \times B$. By selecting A, B, C, KA, KB, and KC such that this equation is satisfied, the center Os of translational forces is made to coincide with the rolling center O.

For example, if it is assumed that all the six suspensions 550A to 550F are equal in cross-sectional area and length, and made of the same material, there is established a relationship of $KC=KA=KB$. Therefore, the center Os of translational forces is selected as a point satisfying a relationship of $C+A=B$. By selecting the values of A, B, and C such that this condition is satisfied, the center Os of translational forces is made to coincide with the rolling center O.

On the other hand, the center Os of translational forces can be set even when the dimensions A, B, and C are prescribed values. For example, when the line segment linking the ends of the suspension 550F and the suspension 550C with each other extends past the rolling center O, the dimension C is 0, so it is appropriate to satisfy the relationship of $KA \times A = KB \times B$. If A is equal to B, it is appropriate to equalize the modulus of elasticity KA of the suspensions 550A and 550B with the modulus of elasticity KB of the suspensions 550D and 550E.

In the first embodiment, the shape of a cross-section should not be specifically limited. For example, the cross-section may assume a circle, an ellipse, a triangle, a rectangle, or a polygon having five or more angles.

The center of mass of the lens holder 600 is uniquely set according to the shape of the lens holder 600. The drive center of the lens holder 600 is uniquely set according to the position of the coil and the mounting position of the magnet. The center of mass of the lens holder 600 and the drive center of the lens holder 600 are usually so set as to coincide with the center Os of translational forces of the suspensions 550A to 550F.

In the actuator 400 for a pickup constructed as described above, the rolling center O or the center Os of translational forces of the suspensions 550A to 550F is arbitrarily set. The rolling center O is thereby made to coincide with the center Os of translational forces, the center of mass of the lens holder 600, and the drive center of the lens holder 600.

[Method of Producing Actuator for Pickup]

To produce the actuator 400 for a pickup, the six suspensions 550A to 550F are first disposed at predetermined positions of a mold (not shown) having a cavity for molding the suspension base 500 and the lens holder 600.

The ends of the suspensions 550A to 550F are located on the virtual circle formed on the plane including both the focusing direction and the tracking direction, and the rolling center defined as the center of the virtual circle is made to coincide with the center of gravity of the lens holder 600, the center of a driving force of the lens holder 600, and the center Os of translational forces of the suspensions 550A to 550F.

After that, a synthetic resin in a fluid state is injected into the mold. Then, the actuator 400 for a pickup is insert-molded with the suspensions 550A to 550F connected between the suspension base 500 and the lens holder 600.

[Operational Effect of Actuator for Pickup]

The actuator 400 for a pickup according to the first embodiment is equipped with the suspension base 500, the lens holder 600 designed to be movable, respectively, in the tracking direction and the focusing direction extending along the optical axis of the objective lens 620 for holding the objective lens 620, and the six suspensions 550A to 550F each having the ends connected to the suspension base 500 and the lens holder 600, respectively. The ends of the six suspensions 550A to 550F are located on the virtual circle X formed on the plane by being projected onto the plane including both the focusing direction and the tracking direction. The rolling center O defined as the center of the virtual circle X is made to coincide with the center of gravity of the lens holder 600, the center of a driving force of the lens holder 600, and the center Os of translational forces of the suspensions 550A to 550F.

Thus, the rolling center O coincides with the aforementioned three centers and no rotational moment is applied to the lens holder 600. As a result, the occurrence of unwanted resonance can be prevented.

Accordingly, a rise in rolling frequency can be suppressed when the lens holder 600 rolls, and deterioration in damping characteristics can be prevented.

To be more specific, the center Os of translational forces of the suspensions 550A to 550F can be set using the equation of balance of moment ($KC \times C + KA \times A = KB \times B$), which is derived from the moduli of elasticity (spring rigidities) KA, KB, and KC of the respective suspensions 550A to 550F and the lengths A, B, and C of the line segments drawn from the rolling center O onto the line segments connecting the ends of those of the suspensions which are adjacent to each other in the tracking direction, respectively. The center of mass can be rationally set so as to coincide with the rolling center O according to the shape of the lens holder, and the center of a driving force can be rationally set so as to coincide with the rolling, center O through adjustment of the mounting positions of the drive coil and the magnet. As a result, the occurrence of unwanted resonance can be prevented effectively.

In addition, the six suspensions 550A to 550F are employed as the linear elastic members. Therefore, when these suspensions 550A to 550F are disposed three by three in a symmetrical pattern around the rolling center O, the spring forces applied to the lens holder 600 can be made laterally even.

The pickup device 1 according to the first embodiment is equipped with the actuator 400 for a pickup constructed as described above, and the coil substrates 610A and 610B and the magnets 340A and 340B for driving the actuator 400 for a pickup. Therefore, the pickup device 1 capable of achieving the aforementioned effect can be provided.

The recording medium drive device according to the first embodiment is equipped with the pickup device 1 constructed as described above. Therefore, the recording medium drive device capable of achieving the aforementioned effect can be provided.

In the first embodiment, the six suspensions 550A to 550F are installed at the predetermined positions of the mold, and a molten resin is injected from the injection port of the mold to perform an insert molding method, in producing the actuator 400 for a pickup. Therefore, simultaneously with the molding of the suspension base 500 and the lens holder 600, those members can be connected by the suspensions 550A to 550F. Thus, the actuator 400 for a pickup can be produced in a short period of time.

Second Embodiment

Next, a second embodiment of the present invention will be described hereinafter with reference to the drawings.

This embodiment is identical in basic structure to the First embodiment of the present invention. In the following description, therefore, components identical to those of the first embodiment of the present invention are denoted by the same reference numerals to omit repetition of the same description. Details different from those of the first embodiment of the present invention will be described.

[Construction of Pickup Device]

Figure 5:
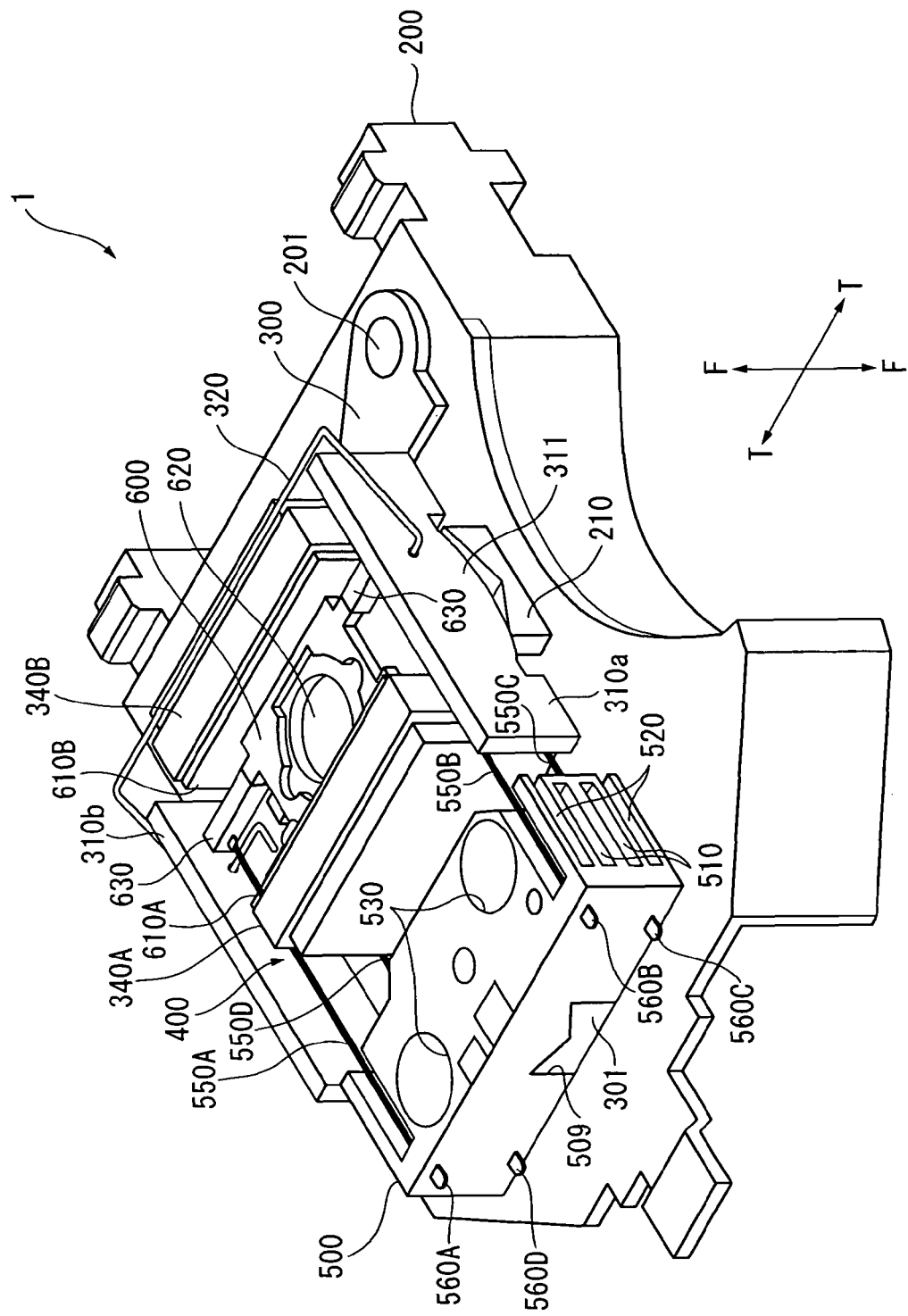
FIG. 5 is a perspective view showing an entire pickup device according to a second embodiment of the present invention.
Figure 6:
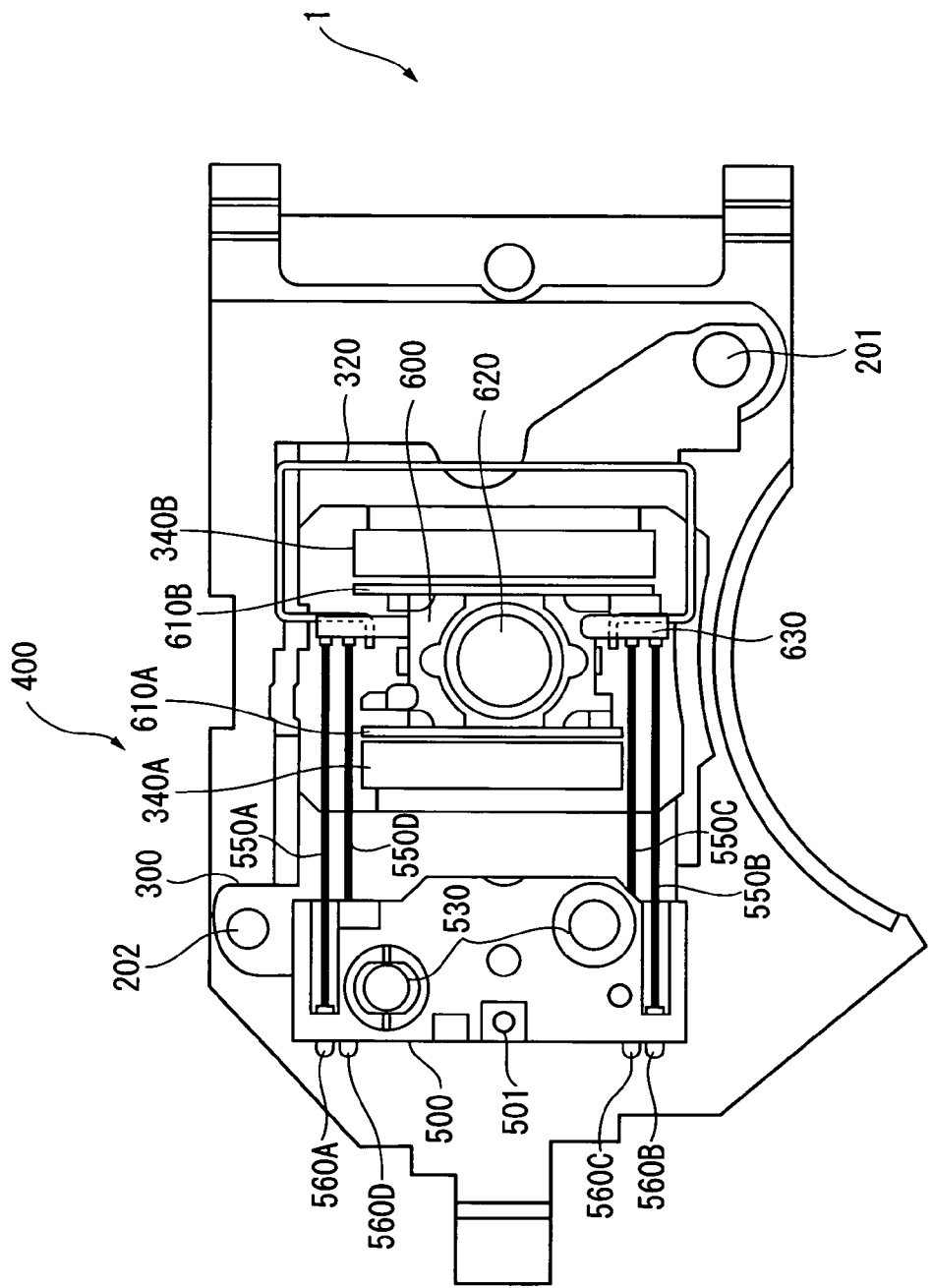
FIG. 6 is a plan view showing the entire pickup device according to the second embodiment of the present invention.

FIGS. 5 and 6 each show the pickup device 1 according to the second embodiment.

The pickup device 1 according to the second embodiment basically has the same construction as in the first embodiment of the present invention. However, while the six suspensions 550A to 550F are used as the linear elastic members in the first embodiment of the present invention, the four suspensions 550A to 550D are used as the linear elastic members in the second embodiment.

That is, the actuator 400 for a pickup is equipped with the suspension base 500 serving as a fixed portion, the lens holder 600 serving as a movable portion, and the six suspensions 550A to 550F (four suspensions 550A to 550D) serving as the linear elastic members for connecting the suspension base 500 and the lens holder 600 to each other.

[Mounting Structure of Suspensions]

Figure 7A:
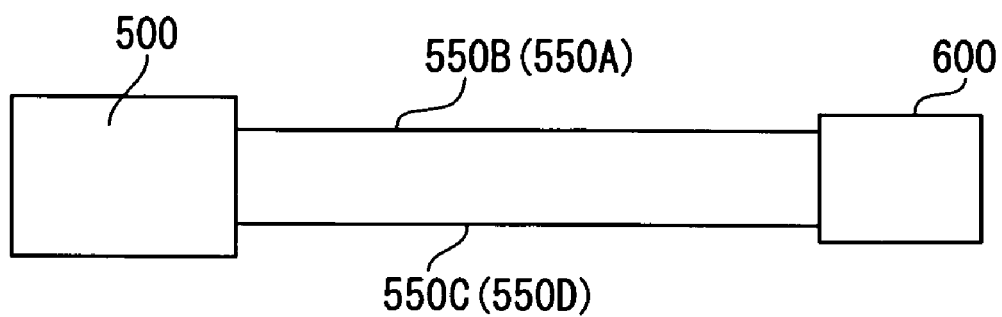
FIG. 7A is a schematic diagram showing a mounting structure of suspensions according to the second embodiment of the present invention as viewed from a tracking direction.
Figure 7B:
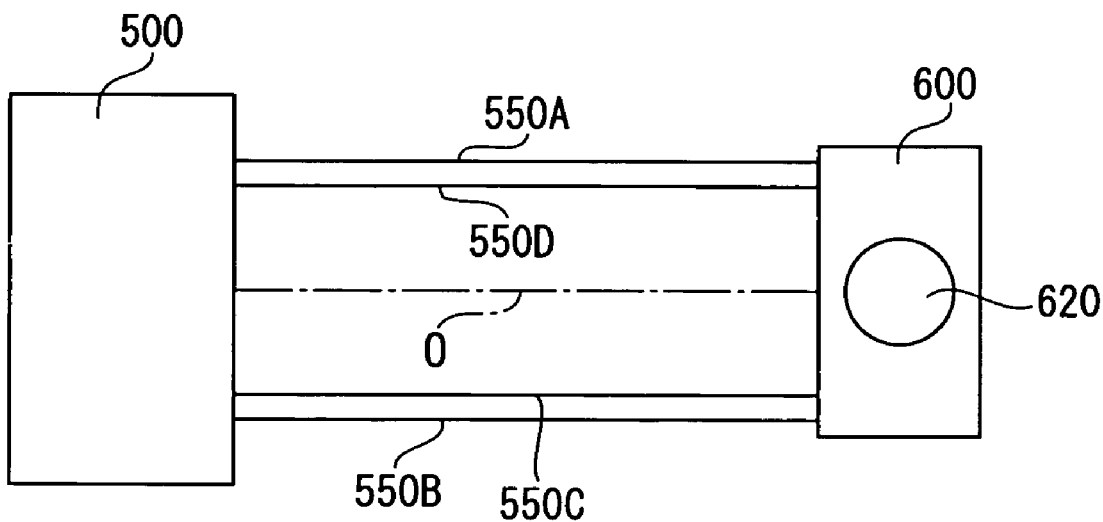
FIG. 7B is a schematic diagram showing the mounting structure of the suspensions according to the second embodiment of the present invention as viewed from a focusing direction.
Figure 8:
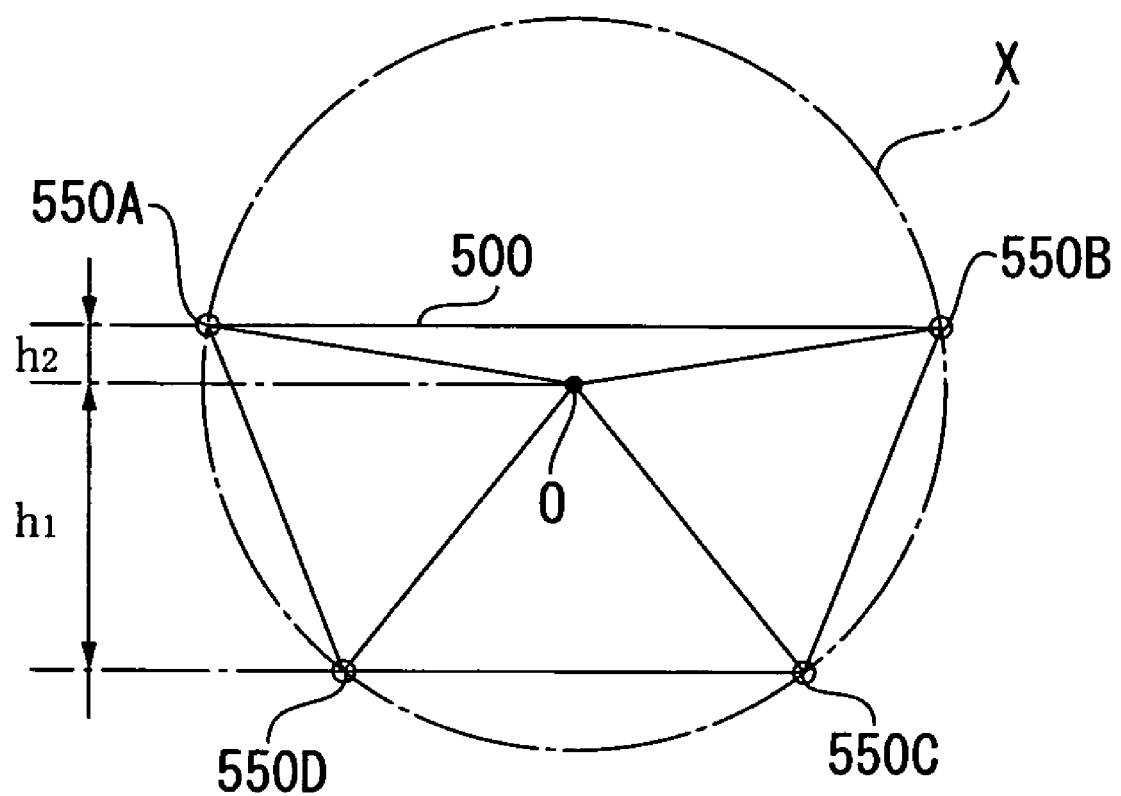
FIG. 8 is a schematic diagram showing the mounting structure of the suspensions according to the second embodiment of the present invention as viewed in a direction from a suspension base to a lens holder.

FIGS. 7A, 7B, and 8 each schematically show a mounting structure of the suspensions 550A to 550D.

In FIGS. 7A and 7B, the four suspensions 550A to 550D are disposed in parallel to one another.

In FIG. 8, the ends (the connection portions) of the four suspensions 550A to 550D on the suspension base 500 side and the lens holder 600 side are located on a virtual circle X, which is formed on a plane by being projected onto a plane including both the focusing direction and the tracking direction. A center O of the virtual circle X is defined as a rolling center of the lens holder 600. The plane on which the virtual circle X is formed in parallel to a plane stretching perpendicularly to a longitudinal direction of the four suspensions 550A to 550D.

The line segments linking the ends of those suspensions 550A to 550D with each other assume substantially a trapezoidal shape. The substantially trapezoidal shape includes not only a shape of a trapezoid having an upper base and a lower base that are strictly parallel to each other, but also a shape of a rectangle having an upper base and a lower base that are not strictly parallel to each other.

The line segment linking the suspensions 550C and 550D with each other constitutes the lower base of the trapezoidal shape, and the dimension of a line segment drawn from the rolling center O onto the lower base is denoted by h1.

The line segment linking the suspensions 550A and 550B with each other constitutes the upper base of the trapezoidal shape, and the dimension of a line segment drawn from the rolling center O onto the upper base is denoted by h2.

The line segments linking the ends of the suspensions 550A to 550D with each other constitute the trapezoidal shape, so the dimensions h1 and h2 are not equal to each other. The ratio between the dimensions of the line segment linking the suspensions 550A and 550B with each other and the line segment linking the suspensions 550C and 550D with each other is arbitrarily set, to thereby set the dimensions h1 and h2. Thus, the height of the rolling center O can be set.

The following arrangement is adopted to set the center Os of translational forces of the suspensions 550A to 550D.

Figure 9:
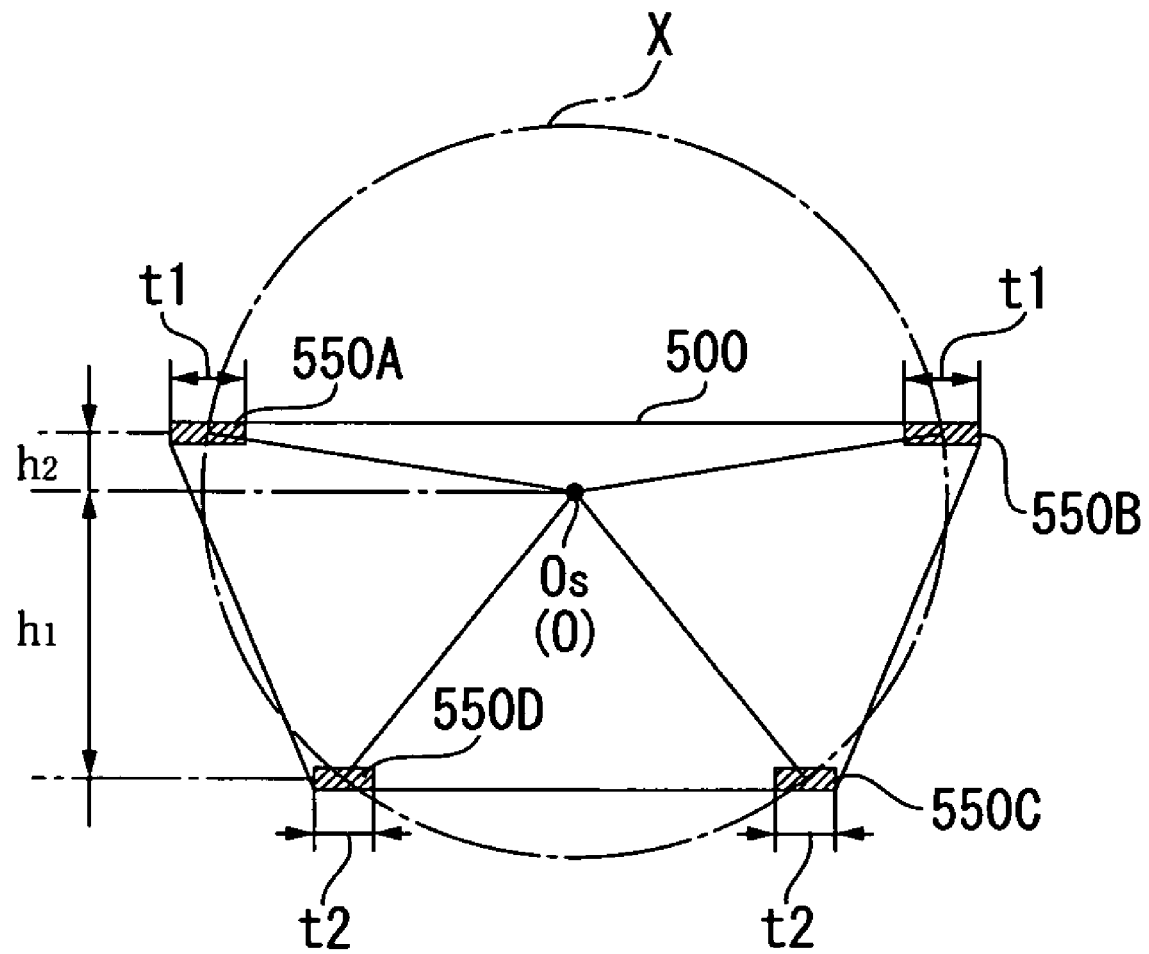
FIG. 9 is a schematic diagram for explaining an arrangement for setting a center Os of translational forces of the suspensions in the second embodiment of the present invention.
Figure 10:
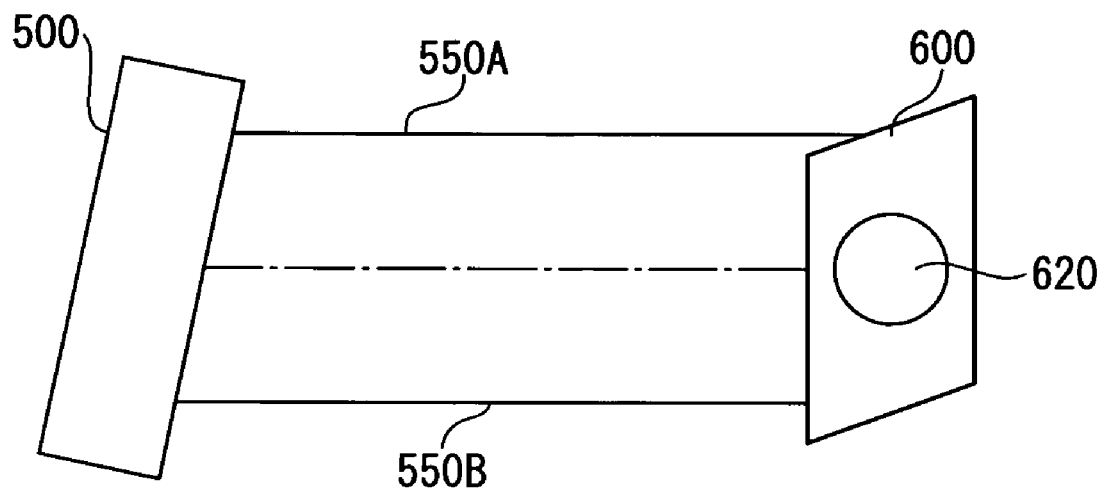
FIG. 10 is a schematic diagram showing a modified example of the present invention, which corresponds to FIGS. 3B and 7B.

As shown in FIG. 9, the suspensions 550A to 550D have a rectangular cross-sectional shape, and the cross-sectional width dimension of the suspensions 550A and 550B constituting the upper base of the trapezoidal shape and the cross-sectional width dimension of the suspensions 550C and 550D constituting the lower base of the trapezoidal shape are denoted by t1 and t2 ($\neq$t1), respectively. These suspensions 550A to 550D are equal in thickness dimension.

If the suspensions 550A to 550D have a large cross-sectional width dimension, they have a large cross-sectional area. Therefore, the spring force (i.e., elastic force) of the suspensions 550A to 550D increases in proportion to the cross-sectional area thereof.

In the second embodiment, the values of t1 and t2 are set, to thereby set the center Os of translational forces of the suspensions 550A to 550D. It should be noted that the center Os of translational forces of the suspensions 550A to 550D is a point where the spring forces do not cause balanced rotation when the lens holder 600 is translated.

For example, if t1 is set larger than t2, the center Os of translational forces is located above. In the second embodiment, the cross-sectional thickness dimension of the suspensions 550A to 550D may be changed instead of the cross-sectional width dimension thereof. Further, the cross-sectional shape of the suspensions 550A to 550D should not be specifically limited as long as the cross-sectional area thereof can be changed. For example, the cross-sectional shape of the suspensions 550A to 550D may be a circle, an ellipse, a triangle, or a polygon having five or more angles.

Materials with different moduli of elasticity are used for the suspensions 550A and 550B and the suspensions 550C and 550D, respectively, thereby making it possible to set the center Os of translational forces of the suspensions 550A to 550D.

The center of mass of the lens holder 600 is uniquely set according to the shape thereof. The drive center of the lens holder 600 is uniquely set according to the positions of the coils and the mounting positions of the magnets. The center of mass of the lens holder 600 and the drive center of the lens holder 600 are usually so set as to coincide with the center Os of translational forces of the suspensions 550A to 550D.

In the actuator 400 for a pickup constructed as described above, the dimensions h1 and h2 are set so as to arbitrarily set the rolling center O, or the center Os of translational forces of the suspensions 550A to 550D is arbitrarily set so as to make the rolling center O coincide with the center Os of translational forces, the center of mass of the lens holder 600, and the drive center of the lens holder 600.

[Method of Producing Actuator for Pickup]

To produce the actuator 400 for a pickup, the four suspensions 550A to 550D are first disposed at predetermined positions of a mold (not shown) having a cavity for molding the suspension base 500 and the lens holder 600.

The ends of the suspensions 550A to 550D are located on the virtual circle formed on the plane including both the focusing direction and the tracking direction, with the line segments which link the ends of those suspensions 550A to 550D with each other assuming substantially a trapezoidal shape, and the rolling center defined as the center of the virtual circle is made to coincide with the center of gravity of the lens holder 600, the center of a driving force of the lens holder 600, and the center Os of translational forces of the suspensions 550A to 550D.

After that, a synthetic resin in a fluid state is injected into the mold. Then, the actuator 400 for a pickup is insert-molded with the suspensions 550A to 550D connected between the suspension base 500 and the lens holder 600.

[Operational Effect of Actuator for Pickup]

The actuator 400 for a pickup according to the second embodiment is equipped with the suspension base 500, the lens holder 600 designed to be movable, respectively, in the tracking direction and the focusing direction extending along the optical axis of the objective lens 620 for holding the objective lens 620, and the six suspensions 550A to 550D each having ends connected to the suspension base 500 and the lens holder 600, respectively. The ends of the four suspensions 550A to 550D are located on the virtual circle X formed on the plane by being projected onto the plane including both the focusing direction and the tracking direction, with the line segments which link the ends of those suspensions 550A to 550D with each other assuming substantially a trapezoidal shape. The rolling center O defined as the center of the virtual circle X is made to coincide with the center of gravity of the lens holder 600, the center of a driving force of the lens holder 600, and the center Os of translational forces of the suspensions 550A to 550D. Thus, the rolling center O coincides with the aforementioned three centers and no rotational moment is applied to the lens holder 600. As a result, the occurrence of unwanted resonance can be prevented. Also, a rise in rolling frequency can be suppressed when the lens holder 600 rolls, and deterioration in damping characteristics can be prevented.

In particular, according to the second embodiment, the line segments linking the ends of the four suspensions 550A to 550D with each other assume the substantially trapezoidal shape. Therefore, the position of the rolling center O can be changed with ease by changing the ratio between the lengths of the upper base and the lower base of the trapezoidal shape.

In setting the center Os of translational forces of the four suspensions 550A to 550D, there may be adopted the arrangement in which the cross-sectional area (width dimension) of the two suspensions 550A and 550B constituting the upper base of the trapezoidal shape is made different from the cross-sectional area (width dimension) of the two suspensions 550C and 550D constituting the lower base of the trapezoidal shape. Then, when the ratio between the cross-sectional areas (width dimensions) of the suspensions 550A and 550B and the suspensions 550C and 550D is set to a minute value, the position of the center Os of translational forces can be adjusted finely.

If the materials with different moduli of elasticity are used for the two suspensions 550A and 550B constituting the upper base of the trapezoidal shape and the two suspensions 550C and 550D constituting the lower base of the trapezoidal shape, respectively, in order to set the center Os of translational forces of the suspensions 550A to 550D, all the suspensions 550A to 550D can be made equal in cross-sectional area (thickness) to those of the conventional art. Thus, the conventional structure can be directly adopted as the structure for connecting the suspensions 550A to 550D to the suspension base 500 and the lens holder 600. Therefore, the actuator 400 for a pickup can be produced with ease.

The pickup device 1 according to the second embodiment is equipped with the actuator 400 for a pickup constructed as described above, and the coil substrates 610A and 610B and the magnets 340A and 340B for driving the actuator 400 for a pickup. Therefore, the pickup device 1 capable of achieving the aforementioned effect can be provided.

The recording medium drive device according to the second embodiment is equipped with the pickup device 1 constructed as described above. Therefore, the recording medium drive device capable of achieving the aforementioned effect can be provided.

In the second embodiment, the four suspensions 550A to 550D are installed at the predetermined positions of the mold, and a molten resin is injected from the injection port of the mold to perform an insert molding method, in producing the actuator 400 for a pickup. Therefore, simultaneously with the molding of the suspension base 500 and the lens holder 600, those members can be connected by the suspensions 550A to 550D. Thus, the actuator 400 for a pickup can be produced in a short period of time.

Modified Example

It should be noted that the recording medium drive device according to the present invention should not be limited to the foregoing embodiments of the present invention but may be modified in various manners without departing from the gist of the present invention.

For example, the insert molding method has been adopted in producing the actuator 400 for a pickup. In the present invention, however, it is also appropriate to mold the suspension base 500 and the lens holder 600 either separately or simultaneously by the injection molding method, and then glue, solder, or screw the suspensions 550A to 550F to the suspension base 500 and the lens holder 600.

Further, in the first embodiment of the present invention, the number of the suspensions 550A to 550F should not be limited to six. For example, the number of suspensions may be five, seven, eight or more.

In the first embodiment of the present invention, the six parallel suspensions are illustrated. However, those suspensions are not absolutely required to extend in parallel to one another. For example, those suspensions may extend in a so-called slanting manner (that is, the suspensions are not in parallel to one another), in which the clearance between fixed support ends thereof is different from the clearance between movable support ends thereof.

In the foregoing embodiments of the present invention, the rolling center O defined as the center of the virtual circle X is made to coincide with the center of gravity of the lens holder 600, the center of a driving force of the lens holder 600, and the center Os of translational forces of the suspensions 550A to 550F. In the present invention, however, it is appropriate to make the rolling center O coincide with at least one of the center of gravity of the lens holder 600, the center of a driving force of the lens holder 600, and the center Os of translational forces of the suspensions 550A to 550F.

For example, only the center of gravity of the lens holder 600 may be made to coincide with the rolling center O. In this case, the center of a driving force of the lens holder 600 and the center Os of translational forces of the suspensions 550A to 550F are not necessarily required to coincide with the rolling center O. Needless to say, it is acceptable to adopt a construction in which any two of the center of gravity of the lens holder 600, the center of a driving force of the lens holder 600, and the center Os of translational forces of the suspensions 550A to 550F coincide with the rolling center O. However, when all of them coincide with one another as in the cases of the foregoing embodiments of the present invention, generation of a rotational moment on the lens holder 600 can be effectively restrained. Thus, the occurrence of unwanted resonance can be suppressed.

Further, in the foregoing respective embodiments of the present invention, the connection portions of the suspensions 550A to 550F are located on the plane including the focusing direction and the tracking direction. However, the present invention also includes cases in which the connection portions of the suspensions 550A to 550F are offset from one another and are not located on the plane. For example, as shown in FIG. 5, the line segments linking the connection portions of the respective suspensions 550A to 550F, which are connected to the lens holder 600, with each other do not extend in parallel to the plane of the coil substrate (not shown) mounted to the lens holder 600. Similarly, the line segments linking the connection portions of the respective suspensions 550A to 550F, which are connected to the suspension base 500, with each other do not extend in parallel to the plane of the coil substrate. In FIG. 5, only the suspensions 550A and 550B are illustrated, and the other suspensions 550C to 550F are not illustrated.

INDUSTRIAL APPLICABILITY

The present invention is applicable to an actuator for a pickup, a pickup device, a recording medium drive device, and a method of producing the actuator for the pickup. The present invention is also applicable to a component or the like for recording data onto an optical recording medium and playing back content thereof.

The invention claimed is:

1. An actuator for a pickup, comprising:
a fixed portion;
a movable portion designed to be movable in each of a focusing direction extending along an optical axis of an objective lens and a tracking direction substantially perpendicular to the focusing direction, due to a driving force transmitted from a drive portion, for holding the objective lens; and
a plurality of linear elastic members of five or more each having ends connected to the movable portion and the fixed portion, respectively, wherein
the plurality of the linear elastic members is equal to one another in length dimension between the fixed portion and the movable portion,
the ends of the plurality of the linear elastic members are located on a virtual circle formed on a plane by being projected onto a plane including both the focusing direction and the tracking direction,
the virtual circle has a center defined as a rolling center with which a center of translational forces of the linear elastic members coincides, and
at least one of a center of gravity of the movable portion and a center of a driving force of the movable portion coincides with the rolling center.

2. An actuator for a pickup comprising:
a fixed portion;
a movable portion designed to be movable in each of a focusing direction extending along an optical axis of an objective lens and a tracking direction substantially perpendicular to the focusing direction, due to a driving force transmitted from a drive portion, for holding the objective lens; and
a plurality of linear elastic members of five or more each having ends connected to the movable portion and the fixed portion, respectively, wherein:
the plurality of the linear elastic members is equal to one another in length dimension between the fixed portion and the movable portion,
the ends of the plurality of the linear elastic members are located on a virtual circle formed on a plane by being projected onto a plane including both the focusing direction and the tracking direction, and
the virtual circle has a center defined as a rolling center, which coincides with a center of translational forces of the linear elastic members, a center of gravity of the movable portion, and a center of a driving force of the movable portion.

3. The actuator for the pickup according to claim 1, wherein
the linear elastic members include six linear elastic members,
the linear elastic members are disposed laterally symmetrically across the rolling center in the tracking direction, and
the linear elastic members which are adjacent to one another in a direction parallel to the tracking direction satisfy a relationship of $KC \times C + KA \times A = KB \times B$ when the linear elastic members close to the rolling center are disposed on one side of the focusing direction, and a relationship of $KA \times A = KC \times C + KB \times B$ when the linear elastic members close to the rolling center are disposed on another side of the focusing direction, given that line segments drawn from the rolling center onto line segments linking the ends of the linear elastic members with each other have length dimensions A, C, and B and moduli of elasticity KA, KC, and KB, respectively, sequentially in the focusing direction.

4. The actuator for the pickup according to claim 2, wherein
the linear elastic members include six linear elastic members,
the linear elastic members are disposed laterally symmetrically across the rolling center in the tracking direction, and
the linear elastic members which are adjacent to one another in a direction parallel to the tracking direction satisfy a relationship of $KC \times C + KA \times A = KB \times B$ when the linear elastic members close to the rolling center are disposed on one side of the focusing direction, and a relationship of $KA \times A = KC \times C + KB \times B$ when the linear elastic members close to the rolling center are disposed on another side of the focusing direction, given that line segments drawn from the rolling center onto line segments linking the ends of the linear elastic members with each other have length dimensions A, C, and B and moduli of elasticity KA, KC, and KB, respectively, sequentially in the focusing direction.

5. A pickup device, comprising:
an actuator for a pickup; and
an actuator drive portion for driving the actuator for the pickup, wherein
the actuator for the pickup includes: a fixed portion; a movable portion designed to be movable in each of a focusing direction extending along an optical axis of an objective lens and a tracking direction substantially perpendicular to the focusing direction, due to a driving force transmitted from a drive portion, for holding the objective lens; and a plurality of linear elastic members of five or more each having ends connected to the movable portion and the fixed portion, respectively,
the plurality of the linear elastic members is equal to one another in length dimension between the fixed portion and the movable portion,
the ends of the plurality of the linear elastic members are located on a virtual circle formed on a plane by being projected onto a plane including both the focusing direction and the tracking direction,
the virtual circle has a center defined as a rolling center with which a center of translational forces of the linear elastic members coincides, and
at least one of a center of gravity of the movable portion and a center of a driving force of the movable portion coincides with the rolling center.

6. A pickup device, comprising:
an actuator for a pickup; and
an actuator drive portion for driving the actuator for the pickup, wherein
the actuator for the pickup includes: a fixed portion; a movable portion designed to be movable in each of a focusing direction extending along an optical axis of an objective lens and a tracking direction substantially perpendicular to the focusing direction, due to a driving force transmitted from a drive portion, for holding the objective lens; and a plurality of linear elastic members of five or more each having ends connected to the movable portion and the fixed portion, respectively,
the plurality of the linear elastic members is equal to one another in length dimension between the fixed portion and the movable portion,
the ends of the plurality of the linear elastic members are located on a virtual circle formed on a plane by being projected onto a plane including both the focusing direction and the tracking direction, and
the virtual circle has a center defined as a rolling center, which coincides with a center of translational forces of the linear elastic members, a center of gravity of the movable portion, and a center of a driving force of the movable portion.

7. A recording medium drive device, comprising:
a pickup device including: an actuator for a pickup; and an actuator drive portion for driving the actuator for the pickup, wherein
the actuator for the pickup includes: a fixed portion; a movable portion designed to be movable in each of a focusing direction extending along an optical axis of an objective lens and a tracking direction substantially perpendicular to the focusing direction, due to a driving force transmitted from a drive portion, for holding the objective lens; and a plurality of linear elastic members of five or more each having ends connected to the movable portion and the fixed portion, respectively,
the plurality of the linear elastic members is equal to one another in length dimension between the fixed portion and the movable portion,
the ends of the plurality of the linear elastic members are located on a virtual circle formed on a plane by being projected onto a plane including both the focusing direction and the tracking direction,
the virtual circle has a center defined as a rolling center with which a center of translational forces of the linear elastic members coincides, and
at least one of a center of gravity of the movable portion and a center of a driving force of the movable portion coincides with the rolling center.

8. A recording medium drive device, comprising:
a pickup device including: an actuator for a pickup; and an actuator drive portion for driving the actuator for the pickup, wherein
the actuator for the pickup includes: a fixed portion; a movable portion designed to be movable in each of a focusing direction extending along an optical axis of an objective lens and a tracking direction substantially perpendicular to the focusing direction, due to a driving force transmitted from a drive portion, for holding the objective lens; and a plurality of linear elastic members of five or more each having ends connected to the movable portion and the fixed portion, respectively,
the plurality of the linear elastic members is equal to one another in length dimension between the fixed portion and the movable portion,
the ends of the plurality of the linear elastic members are located on a virtual circle formed on a plane by being projected onto a plane including both the focusing direction and the tracking direction, and
the virtual circle has a center defined as a rolling center, which coincides with a center of translational forces of the linear elastic members, a center of gravity of the movable portion, and a center of a driving force of the movable portion.

9. A method of producing an actuator for a pickup including: a fixed portion; a movable portion designed to be movable in each of a focusing direction extending along an optical axis of an objective lens and a tracking direction substantially perpendicular to the focusing direction, to hold the objective lens; and a plurality of linear elastic members of five or more each having ends connected to the movable portion and the fixed portion, respectively,
the method, comprising:
equalizing the plurality of the linear elastic members to one another in length dimension between the fixed portion and the movable portion,
locating the ends of the plurality of the linear elastic members on a virtual circle formed on a plane by being projected onto a plane including both the focusing direction and the tracking direction, respectively;
making a center of translational forces of the linear elastic members coincide with a center of the virtual circle which is defined as a rolling center, and
making at least one of a center of gravity of the movable portion and a center of a driving force of the movable portion coincide with the rolling center.

10. The method of producing the actuator for the pickup according to claim 9, further comprising:
installing the linear elastic members in a mold for molding the fixed portion and the movable portion; and
insert-molding the actuator for the pickup through injection of a molten resin from an injection port of the mold.

* * * * *